(12) United States Patent
McCullough et al.

(10) Patent No.: US 6,316,513 B1
(45) Date of Patent: Nov. 13, 2001

(54) PROCESS FOR THE PRODUCING OF HARD POLYURETHANE FOAMS WITH LOW HEAT CONDUCTIVITY

(75) Inventors: Dennis McCullough, Lake Orion, MI (US); Torsten Heinemann; Norbert Eisen, both of Köln (DE); Walter Klän, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/194,979

(22) PCT Filed: May 28, 1997

(86) PCT No.: PCT/EP97/02767

§ 371 Date: Mar. 8, 1999

§ 102(e) Date: Mar. 8, 1999

(87) PCT Pub. No.: WO97/47673

PCT Pub. Date: Dec. 18, 1997

(30) Foreign Application Priority Data

Jun. 10, 1996 (DE) .............................. 196 23 065

(51) Int. Cl.$^7$ .................................. C08G 18/04
(52) U.S. Cl. .................. 521/174; 521/163; 521/167; 521/170; 521/172
(58) Field of Search ................... 521/172, 173, 521/174, 170, 163, 167

(56) References Cited

U.S. PATENT DOCUMENTS

| | | | |
|---|---|---|---|
| 4,931,482 | 6/1990 | Lamberts et al. ............ | 521/131 |
| 5,096,933 | 3/1992 | Volkert ...................... | 521/131 |
| 5,391,317 | 2/1995 | Smits ....................... | 252/182.24 |
| 5,428,104 | 6/1995 | Barker et al. ............... | 524/795 |
| 5,602,190 | 2/1997 | Lamberts et al. ............ | 521/131 |

FOREIGN PATENT DOCUMENTS 2119479  9/1994  (CA) .

OTHER PUBLICATIONS

Molina, Rowland, Nature, vol. 249, Jun. 28, 1974, p. 810.
Vorsoarge zum Schutz der Erdatmosphäre, Feb. 11, 1988, German Parliament, public relations department, Bonn.
Chemical Abstracts, vol. 119, No. 8, Aug. 23, 1993, Abstract #73906k.

*Primary Examiner*—John M. Cooney, Jr.
(74) *Attorney, Agent, or Firm*—Joseph C. Gil; N. Denise Brown

(57) ABSTRACT

A process for the production of rigid polyurethane foams having low thermal conductivity is described. This process comprises reacting A) a polyol component comprising:
  (1) at least one polyester polyol having a molecular weight of from 100 to 30,000 g/mol and containing at least two isocyanate-reactive hydrogen atoms;
  (2) at least one polyether polyol having a molecular weight of from 150 to 12,500 g/mol and containing at least two isocyanate-reactive hydrogen atoms and at least one tertiary nitrogen atom, and being prepared from a starter compound comprising ammonia or a compound containing at least one primary, secondary or tertiary amino group;
  (3) at least one polyether polyol having a molecular weight of from 150 to 12,500 g/mol and containing at least two isocyanate-reactive hydrogen atoms, and being prepared from a starter compound comprising water or a polyhydric alcohol;
  (4) at least one catalyst;
  (5) water
  (6) at least one blowing agent; and, optionally
  (7) auxiliary substances and/or additives; with
B) an organic polyisocyanate having an NCO group content of from 20 to 48% by weight.

Cyclopentane blown rigid polyurethane foams which exhibit low thermal conductivity and the end-use of such foams as an interlayer in a process for the production of composite components and for filling cavities is also disclosed.

14 Claims, No Drawings

PROCESS FOR THE PRODUCING OF HARD POLYURETHANE FOAMS WITH LOW HEAT CONDUCTIVITY

This invention relates to a novel process for the production of substantially closed-cell rigid polyurethane foams.

Due to their low thermal conductivity, rigid polyurethane foams are used for insulation applications in refrigeration and freezing appliances, in industrial equipment, tank farms, pipelines, shipbuilding and in the construction industry. A summary review of the production of rigid polyurethane foams and the use thereof is given in *Kunststoff-Handbuch*, volume 7 (Polyurethane), 2nd edition 1983, edited by Dr. G ünter Oertel (Carl Hanser Verlag, Munich).

The thermal conductivity of a largely closed-cell rigid polyurethane foam is largely dependent upon the nature of the blowing agent or cell gas used. Completely halogenated chlorofluorocarbons (CFCs), inparticular trichlorofluoromethane (R11), which has particularly low thermal conductivity, had proved particularly suitable for this purpose. These substances are chemically inert and non-toxic. However, due to their elevated stability, completely halogenated chlorofluorocarbons reach the stratosphere, where, due to their chlorine content, they play a part in breaking down the ozone present there (for example Molina, Rowland, *Nature* 249 (1974) 810; first interim report of the German Parliament's commission of enquiry, *Vorsorge zum Schutz der Erdatmosphäre* [precautions for the protection of the earth's atmosphere] of 02.11.1988, German Parliament, public relations department, Bonn).

Formulations containing a lower R11 concentration have been proposed in order to reduce the R11 content in rigid polyurethane foams.

It has also be proposed (for example EP 344 537, U.S. Pat. No. 4,931,482) to use partially fluorinated hydrocarbons (hydrofluoroalkanes) which still contain at least one carbon-hydrogen bond as a blowing agent. Substances from this class of compounds contain no chlorine atoms and thus have a ODP value (ozone depletion potential) of zero (by way of comparison: R11: ODP=1). Typical representatives of this class of substances are, for example: 1,1,1,4,4,4-hexafluorobutane (R356) or 1,1,1,3,3-pentafluoropropane (245fa).

It is furthermore known to use hydrocarbons, either pure or as a mixture (U.S. Pat. No. 5,391,317), such as n- or i-pentane, 2,2-dimethylbutane, cyclopentane or cyclohexane as blowing agents. It is also known to use hydrocarbons in conjunction with water as blowing agents (EP 0 421 269).

It is moreover known that, by virtue of their chemical structure, unsubstituted hydrocarbons are highly non-polar and thus mix very poorly with the polyols conventionally used in rigid foam production. Complete miscibility is, however, an important prerequisite for the conventional production technique in which the polyol and isocyanate components are mechanically foamed. In addition to the reactive polyether- or polyesterpolyols, the polyol component also contains blowing agents and auxiliaries such as activators, emulsifiers and stabilisers in dissolved form. It is known that polyol formulations containing aminopolyethers exhibit particularly high alkane solubility (WO 94/03515).

It is also known that hydrocarbon-blown rigid foams have poorer thermal conductivities than rigid foams blown with R11 or with reduced quantities of R11, which is due to the higher thermal conductivities of hydrocarbon gases. (Thermal conductivities of the gases at 20° C.: R11: 8 mW/mK; cyclopentane: 10 mW/mK; n-pentane, 13 mW/mK; i-pentane, 13 mW/mK).

The object of the present invention was to provide hydrocarbon-blown rigid polyurethane foams which have thermal conductivities of the same low level as foams blown with reduced quantities of R11.

It has surprisingly been found that polyol formulations based on a certain polyol mixture yield foams having thermal conductivities which are at the same, low level as foams blown with reduced quantities of R11, in particular if cyclopentane is used as the blowing agent.

The present invention accordingly provides a process for the production of rigid polyurethane foams having low thermal conductivity from polyols and polyisocyanates together with blowing agents and optionally foam auxiliaries, characterised in that the rigid polyurethane foam is obtained by reacting A. a polyol component containing
  1. at least one polyesterpolyol of a molecular weight of 100 to 30000 g/mol having at least two isocyanate-reactive hydrogen atoms,
  2. compounds of a molecular weight from 150 to 12500 g/mol containing at least two isocyanate-reactive hydrogen atoms, the molecules of which compounds contain at least one tertiary nitrogen atom,
  3. compounds of a molecular weight from 150 to 12500 g/mol containing at least two isocyanate-reactive hydrogen atoms,
  4. catalysts,
  5. water,
  6. blowing agent and
  7. optionally auxiliary substances and additives with
B. an organic and/or modified organic polyisocyanate having an NCO content of 20 to 48 wt. %.

It is surprising that the combination according to the invention of a polyesterpolyol with the stated aminopolyethers and a further polyol in the polyol component of hydrocarbon-blown foams should result in such a low thermal conductivity.

Polyol formulations according to the invention contain at least one polyesterpolyol of the molecular weight from 100 to 30000 g/mol, preferably of 150 to 10000 g/mol, particularly preferably of 200 to 600 g/mol, prepared from aromatic and/or aliphatic mono-, di- or tricarboxylic acids and polyols containing at least two hydroxyl groups. Examples of dicarboxylic acids are phthalic acid, fumaric acid, maleic acid, azelaic acid, glutaric acid, adipic acid, suberic acid, terephthalic acid, isophthalic acid, decanedicarboxylic acid, malonic acid, glutaric acid, succinic acid and fatty acids such as stearic acid, oleic acid, ricinoleic acid. Both the pure mono-, di- or tricarboxylic acids and any desired mixtures thereof may be used. Instead of the free mono-, di- and tricarboxylic acids, it is also possible to use the corresponding mono-, di- and tricarboxylic acid derivatives, such as for example mono-, di- and tricarboxylic acid esters of alcohols having 1 to 4 carbon atoms or mono-, di- and tricarboxylic anhydrides or triglycerides. The following are preferably used as the alcohol component for esterification: ethylene glycol, diethylene glycol, triethylene glycol, tetraethylene glycol, 1,2- or 1,3-propanediol, 1,4-butanediol, 1,5-pentanediol, 1,6-hexanediol, 1,10-decanediol, glycerol, trimethylolpropane or mixtures thereof.

According to the invention, polyol formulations may also contain polyether esters, as may, for example, be obtained by reacting phthalic anhydride with diethylene glycol and subsequently with ethylene oxide (EP-A 0 250 967).

Polyol formulations according to the invention contain at least one compound of the molecular weight from 150 to 12500 g/mol, preferably of 200 to 1500 g/mol, containing at least two isocyanate-reactive hydrogen atoms, the molecules of which compound contain at least one tertiary nitrogen atom. These compounds are obtained by polyaddition of alkylene oxides, such as for example ethylene oxide, propylene oxide, butylene oxide, dodecyl oxide or styrene oxide, preferably propylene oxide or ethylene oxide, onto starter compounds. The starter compounds used are ammonia or compounds containing at least one primary or secondary or tertiary amino group, such as for example aliphatic amines such as ethylenediamine, ethylenediamine oligomers (for example diethylenetriamine, triethylenetetramine or pentaethylenehexamine), ethanolamine, diethanolamine, triethanolamine, N- methyl- or N-ethyldiethanolamine, 1,3-propylenediamine, 1,3- or 1,4-butylenediamine, 1,2-, 1,3-, 1,4-, 1,5-, 1,6-hexamethylenediamine, aromatic amines such as phenylenediamines, tolylenediamines (2,3-tolylenediamine, 3,4-tolylenediamine, 2,4-tolylenediamine, 2,5-tolylenediamine, 2,6-tolylenediamine or mixtures of the stated isomers), 2,2'-diaminodiphenylmethane, 2,4'-diaminodiphenylmethane, 4,4'-diaminodiphenylmethane or mixtures of these isomers.

Polyol formulations according to the invention moreover contain at least one compound of the molecular weight from 150 to 12500 g/mol, preferably of 200 to 1500 g/mol, containing at least two isocyanate-reactive hydrogen atoms. These compounds are obtained by polyaddition of alkylene oxides, such as for example ethylene oxide, propylene oxide, butylene oxide, dodecyl oxide or styrene oxide, preferably propylene oxide or ethylene oxide, onto starter compounds. The starter compounds used are preferably water and polyhydric alcohols such as sucrose, sorbitol, pentaerythritol, trimethylolpropane, glycerol, propylene glycol, ethylene glycol, diethylene glycol together with mixtures of the stated starter compounds. These polyols which are also to be used according to the invention advantageously allow the rigid polyurethane foams to achieve the mechanical properties which are conventionally required in practice.

Polyol formulations according to the invention contain an activator or an activator mixture, which results in a fibre time of 20 to 50 s, preferably of 25 to 45 s, particularly preferably of 27 to 40 s if foaming is performed at 20° C. using a Hennecke HK 270 high pressure machine. The fibre time extends from the time of mixing to the moment from which a rod introduced into the foam draws fibres when withdrawn.

According to the invention, the catalysts conventional in polyurethane chemistry may be used. Examples of such catalysts are: triethylenediamine, N,N-dimethylcyclohexylamine, tetramethylenediamine, 1-methyl-4-dimethylaminoethylpiperazine, triethylamine, tributylamine, dimethylbenzylamine, N,N',N"-tris-(dimethylaminopropyl)hexahydrotriazine, dimethylaminopropylformamide, N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo(3.3.0)octane, bis-(dimethylaminopropyl)urea, bis-(dimethylaminopropyl) ether, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, tin(II) acetate, tin(II) octoate, tin(II) ethylhexoate, tin(II) laurate, dibutyltin diacetate, dibutyltin dilaurate, dibutyltin maleate, dioctyltin diacetate, tris-(N,N-dimethylaminopropyl)-s-hexahydrotriazine, tetramethylammonium hydroxide, sodium acetate, potassium acetate, sodium hydroxide or mixtures of these or similar catalysts.

Polyol formulations according to the invention contain 0.5 to 7.0 parts by weight, preferably 1.0 to 3.0 parts by weight of water per 100 parts by weight of polyol component A.

Alkanes such as cyclohexane, cyclopentane, i-pentane, n-pentane, n-butane, isobutane, 2,2-dimethylbutane and mixtures of the stated blowing agents are used according to the invention.

Aromatic polyisocyanates, as are for example described by W. Siefken in *Justus Liebigs Annalen der Chemie,* 562, pages 75 to 136, [are used], for example, as the isocyanate component, for example those of the formula

in which n means 2 to 4, preferably 2, and

Q means an aliphatic hydrocarbon residue having 2 to 18, preferably 6 to 10, C atoms, a cycloaliphatic hydrocarbon residue having 4 to 15, preferably 5 to 10, C atoms, an aromatic hydrocarbon residue having 8 to 15, preferably 8 to 13, C atoms, for example such polyisocyanates as are described in DE-OS 28 32 253, pages 10 to 11.

The industrially readily available polyisocyanates are generally particularly preferred, for example 2,4- and 2,6-tolylene diisocyanate and any desired mixtures of these isomers ("TDI"), polyphenylpolymethylene polyisocyanates, as are produced by aniline/formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular modified polyisocyanate derived from 2,4- and 2,6-tolylene diisocyanate or from 4,4'- and/or 2,4'-diphenylmethane diisocyanate.

It is also possible to use prepolymers prepared from the stated isocyanates and organic compounds having at least one hydroxyl group, such as for example polyol or polyester components containing 1 to 4 hydroxyl groups and of a molecular weight of 60 to 1400 g/mol.

Paraffins or fatty alcohols or dimethylpolysiloxanes together with pigments or dyes, as well as stabilisers against ageing and weathering, plasticisers and substances having a fungistatic and bacteriostatic action, together with fillers such as barium sulphate, diatomaceous earth, carbon black or prepared chalk may also be used.

Further examples of substances optionally also used according to the invention such as surface-active additives and foam stabilisers, together with cell regulators, reaction inhibitors, stabilisers, flame retardant substances, dyes and fillers, together with fungistatically and bacteriostatically active substances, together with details relating to the manner of use and mode of action of these additives are described in *Kunststoff-Handbuch,* volume VII, edited by Vieweg and Höchtlen, Carl Hanser Verlag, Munich 1966, for example on pages 121 to 205, and 2nd edition 1983, edited by G. Oertel (Carl Hanser Verlag, Munich).

According to the invention, foaming during foam production may also be performed in closed moulds. In this case, the reaction mixture is introduced into a mould. Mould materials which may be considered are metal, for example aluminium, or plastic, for example epoxy resin. The foamable reaction mixture foams in the mould and forms the moulding. Mould foaming may be performed in such a manner that the moulding has a cellular structure on its surface. It may, however, also be performed in such a manner that the moulding has a compact skin and a cellular core. According to the invention, the method used in the first case is to introduce a quantity of reaction mixture into the mould such that the resultant foam exactly fills the mould. The method used in the latter case involves introducing more foamable reaction mixture into the mould than is necessary to fill the mould cavity with foam. In the latter case, "overcharging" is thus used, such a process being known, for example, from U.S. Pat. Nos. 3,178,490 and 3,182,104.

The present invention also provides the use of the rigid foams produced according to the invention as an interlayer for composite components and for filling cavities, especially in the production of refrigeration equipment.

The process according to the invention is preferably used for filling cavities in refrigeration and freezing appliances. The foams may of course also be produced by slab foaming or using the per se known twin conveyor belt process.

The rigid foams obtainable according to the invention are used, for example, in the construction sector, and for insulating district heating pipes and transport containers.

The following examples are intended to illustrate the invention, but without restricting the scope thereof.

In all the Examples, the rigid polyurethane foams were produced at 20° C. in a Hennecke HK 270 high pressure machine.

The fibre times stated in the individual examples were determined in the following manner: the fibre time extends from the time of mixing to the moment from which a rod introduced into the foam draws fibres when withdrawn.

Polyol A: Polypropylene oxide polyether of molecular weight 600 based on sucrose/glycerol
Polyol B: Polypropylene oxide polyether of molecular weight 1000 based on propylene glycol
Polyol C: Polypropylene oxide polyether of molecular weight 630 based on sucrose/propylene glycol
Polyol D: Polypropylene oxide polyether of molecular weight 370 based on glycerol
Polyol E: Polypropylene oxide polyether of molecular weight 345 based on ethylenediamine
Polyol F: Polypropylene oxide polyether of molecular weight 440 based on trimethylolpropane
Polyol G: Polyether ester of molecular weight 375 based on phthalic anhydride, diethylene glycol and ethylene oxide
Polyol H: Polypropylene oxide polyether of molecular weight 1120 based on triethanolamine
Polyol I: Polypropylene oxide polyether of molecular weight 560 based on o-tolylenediamine
Polyol K: Polypropylene oxide polyether of molecular weight 275 based on ethylenediamine

EXAMPLE 1

(not according to the invention)
Formulation for rigid polyurethane foam
Component A
80 parts by weight of polyol A
20 parts by weight of polyol B
3.5 parts by weight of water
2.0 parts by weight of silicone stabiliser
3.5 parts by weight of activator mixture consisting of activator Desmorapid PV (Bayer AG), activator Desmorapid 726b (Bayer AG) and potassium acetate (25%) in diethylene glycol
100 parts by weight of component A are mixed at 20° C. with 17 parts by weight of CFC R11 and 145 parts by weight of crude MDI (Desmodur 44V20, Bayer AG) and compacted to 32 kg/m$^3$ in a closed mould.

EXAMPLE 2

(not according to the invention)
Formulation for rigid polyurethane foam
Component A
55 parts by weight of polyol C
25 parts by weight of polyol D
20 parts by weight of polyol E
2.0 parts by weight of water
2.0 parts by weight of silicone stabiliser
2.0 parts by weight of activator mixture consisting of activator Desmorapid PV (Bayer AG) and activator Desmorapid 726b (Bayer AG)
100 parts by weight of component A are mixed at 20° C. with 12 parts by weight of cyclopentane (Erdölchemie) and 151 parts by weight of crude MDI (Desmodur 44V20, Bayer AG) and compacted to 38 kg/m$^3$ in a closed mould.

EXAMPLE 3

(not according to the invention)
Formulation for rigid polyurethane foam
Component A
50 parts by weight of polyol A
40 parts by weight of polyol F
10 parts by weight of polyol G
2.0 parts by weight of water
2.0 parts by weight of silicone stabiliser
2.5 parts by weight of activator mixture consisting of activator Desmorapid PV (Bayer AG) and activator Desmorapid 726b (Bayer AG)
100 parts by weight of component A are mixed at 20° C. with 13 parts by weight of cyclopentane (Erdölchemie) and 148 parts by weight of crude MDI (Desmodur 44V20, Bayer AG) and compacted to 38 kg/m$^3$ in a closed mould.

EXAMPLE 4

(not according to the invention)
Formulation for rigid polyurethane foam
Component A
50 parts by weight of polyol C
25 parts by weight of polyol E
25 parts by weight of polyol H
2.2 parts by weight of water
2.0 parts by weight of silicone stabiliser
1.5 parts by weight of activator mixture consisting of activator Desmorapid PV (Bayer AG) and activator Desmorapid 726b (Bayer AG)
100 parts by weight of component A are mixed at 20° C. with 11 parts by weight of i,n-pentane (8:3) and 142 parts by weight of crude MDI (Desmodur 44V20, Bayer AG) and compacted to 36 kg/m$^3$ in a closed mould.

EXAMPLE 5

(not according to the invention)
Formulation for rigid polyurethane foam
Component A
55 parts by weight of polyol C
20 parts by weight of polyol D
25 parts by weight of polyesterpolyol Stepanpol® 2352 (Stepan)
2.1 parts by weight of water
2.0 parts by weight of silicone stabiliser 1.5 parts by weight of activator mixture consisting of activator Desmorapid PV (Bayer AG) and activator Desmorapid 726b (Bayer AG)

100 parts by weight of component A are mixed with 12 parts by weight of cyclopentane (Erdölchemie). The mixture (component A+cyclopentane) immediately becomes turbid and separates.

EXAMPLE 6

(not according to the invention)

Formulation for rigid polyurethane foam

Component A 55 parts by weight of polyol C
20 parts by weight of polyol D
25 parts by weight of polyesterpolyol Stepanpol® 2352 (Stepan)
2.3 parts by weight of water
2.0 parts by weight of silicone stabiliser
1.5 parts by weight of activator mixture consisting of activator Desmorapid PV (Bayer AG) and activator Desmorapid 726b (Bayer AG)

100 parts by weight of component A are mixed with 11 parts by weight of i,n-pentane (3:8). The mixture (component A+i,n-pentane) immediately becomes turbid and separates.

EXAMPLE 7

(according to the invention)

Formulation for rigid polyurethane foam

Component A 40 parts by weight of polyol C
20 parts by weight of polyol I
15 parts by weight of polyol K
25 parts by weight of polyesterpolyol Stepanpol® 2352 (Stepan)
2.4 parts by weight of water
2.0 parts by weight of silicone stabiliser
1.4 parts by weight of activator Desmorapid PV (Bayer AG)
0.4 parts by weight of activator N,N',N"-tris-(dimethylaminopropyl)hexahydrotriazine 100 parts by weight of component A are mixed at 20° C. with 15 parts by weight of cyclopentane (Erdölchemie) and 161 parts by weight of crude MDI (Desmodur 44V20, Bayer AG) and compacted to 34 kg/m³ in a closed mould.

EXAMPLE 8

(according to the invention)

Formulation for rigid polyurethane foam

Component A 20 parts by weight of polyol C
40 parts by weight of polyol I
15 parts by weight of polyol K
25 parts by weight of polyesterpolyol Stepanpol® 2352 (Stepan)
2.4 parts by weight of water
2.0 parts by weight of silicone stabiliser
1.4 parts by weight of activator Desmorapid PV (Bayer AG)
0.4 parts by weight of activator N,N',N"-tris-(dimethylaminopropyl)hexahydrotriazine 100 parts by weight of component A are mixed at 20° C. with 15 parts by weight of cyclopentane (Erdölchemie) and 157 parts by weight of crude MDI (Desmodur 44V20, Bayer AG) and compacted to 34 kg/m³ in a closed mould.

EXAMPLE 9

(according to the invention)

Formulation for rigid polyurethane foam

Component A 10 parts by weight of polyol C
50 parts by weight of polyol I
15 parts by weight of polyol K
25 parts by weight of polyesterpolyol Stepanpol® 2352 (Stepan)
2.4 parts by weight of water
2.0 parts by weight of silicone stabiliser
0.5 parts by weight of activator Desmorapid PV (Bayer AG)
0.5 parts by weight of activator dimethylaminopropylformamide
0.4 parts by weight of activator N,N',N"-tris-(dimethylaminopropyl)hexahydrotriazine 100 parts by weight of component A are mixed at 20° C. with 17 parts by weight of cyclopentane (Erdölchemie) and 170 parts by weight of MDI prepolymer (E577, Bayer AG) and compacted to 36 kg/m³ in a closed mould.

EXAMPLE 10

(according to the invention)

Formulation for rigid polyurethane foam

Component A 40 parts by weight of polyol C
10 parts by weight of polyol G
50 parts by weight of polyol I
2.5 parts by weight of water
2.0 parts by weight of silicone stabiliser
0.5 parts by weight of activator Desmorapid PV (Bayer AG)
1.6 parts by weight of activator Desmorapid 726b (Bayer AG)

100 parts by weight of component A are mixed at 20° C. with 13 parts by weight of cyclopentane (Erdölchemie) and 135 parts by weight of crude MDI (Desmodur 44V20, Bayer AG) and compacted to 35 kg/m³ in a closed mould.

EXAMPLE 11

(according to the invention)

Formulation for rigid polyurethane foam

Component A 20 parts by weight of polyol C
45 parts by weight of polyol I
15 parts by weight of polyol K
20 parts by weight of polyesterpolyol Stepanpol® 2352 (Stepan)
2.4 parts by weight of water
2.0 parts by weight of silicone stabiliser
1.2 parts by weight of activator Desmorapid PV (Bayer AG)
0.4 parts by weight of activator N,N',N"-tris-(dimethylaminopropyl)hexahydrotriazine 100 parts by weight of component A are mixed at 20° C. with 13 parts by weight of i,n-pentane (3:8) and 151 parts by weight of MDI prepolymer (Desmodur 44V20, Bayer AG) and compacted to 35 kg/m³ in a closed mould.

The test values shown in the Table were obtained from the foam slabs produced in Examples 1 to 11.

| Example | Phase stability of component A containing blowing agent | Fibre time of foam (s) | Thermal conductivity (mW/mK) to DIN 52616, 24° C. |
| --- | --- | --- | --- |
| 1 | clear, stable mixture | 50 | 19.6 |
| 2 | clear, stable mixture | 50 | 21.5 |
| 3 | clear, stable mixture | 29 | 21.6 |

-continued

| Example | Phase stability of component A containing blowing agent | Fibre time of foam (s) | Thermal conductivity (mW/mK) to DIN 52616, 24° C. |
|---------|---------------------------------------------------------|------------------------|---------------------------------------------------|
| 4       | clear, stable mixture    | 50 | 23.7 |
| 5       | turbid, separated mixture | —  | —    |
| 6       | turbid, separated mixture | —  | —    |
| 7       | clear, stable mixture    | 25 | 19.9 |
| 8       | clear, stable mixture    | 25 | 19.7 |
| 9       | clear, stable mixture    | 31 | 19.9 |
| 10      | clear, stable mixture    | 27 | 19.9 |
| 11      | clear, stable mixture    | 28 | 22.0 |

Example 1 shows a typical result for an R11-reduced system.

Examples 2 and 3 are prior art cyclopentane-blown systems having standard thermal conductivities.

Although Example 3 contains a polyesterpolyether and an activator mixture according to the invention, which results in a fibre time of 29 s, a standard thermal conductivity is found.

Example 4 is a prior art i,n-pentane-blown system.

Examples 5 and 6 contains no amine-started polyols; the polyol formulation is thus not phase-stable with regard to cyclopentane and cannot be foamed using conventional techniques.

Examples 7 to 10 show that, using the process according to the invention with cyclopentane as the blowing agent, foams are obtained having the same low thermal conductivity as foams blown with reduced quantities of R11.

Example 1 1 shows that foams having low thermal conductivities are also obtained using the process according to the invention with i,n-pentane as the blowing agent.

What is claimed is:

1. A process for the production of rigid polyurethane foams having low thermal conductivity comprising reacting
   A) a polyol component comprising:
   (1) at least one polyester polyol having a molecular weight of from 100 to 30,000 g/mol and containing at least two isocyanate-reactive hydrogen atoms;
   (2) at least one polyether polyol having a molecular weight of from 150 to 12,500 g/mol and containing at least two isocyanate-reactive hydrogen atoms and at least one tertiary nitrogen atom, and being prepared by the polyaddition of one or more alkylene oxides onto at least one starter compound, wherein the starter compound comprises ammonia, or a compound containing at least one primary, secondary or tertiary amino group;
   (3) at least one polyether polyol having a molecular weight of from 150 to 12,500 g/mol and containing at least two isocyanate-reactive hydrogen atoms, and being prepared by the polyaddition of one or more alkylene oxides onto at least one starter compound, wherein the starter compound comprises water or a polyhydric alcohol;
   (4) at least one catalyst;
   (5) water
   (6) at least one blowing agent selected from the group consisting of n-butane, isobutane, isopentane, cyclopentane, 2,2-dimethylbutane, cyclohexane, and mixtures thereof; and, optionally
   (7) auxiliary substances and/or additives; with
   B) an organic polyisocyanate having an NCO group content of from 20 to 48% by weight, wherein said polyisocyanate is optionally modified.

2. The process of claim 1, wherein A)(1) said polyester polyol having a molecular weight of from 100 to 30,000 is prepared by reacting (i) one or more aromatic and/or aliphatic mono-, di- and tricarboxylic acids with (ii) one or more polyols containing at least two hydroxyl groups.

3. The process of claim 1, wherein A)(2) comprises an o-tolylene-diamine initiated polyether polyol which contains from 70 to 100% by weight of 1,2-propylene oxide and from 0 to 30% by weight of ethylene oxide, with the percents by weight of 1,2-propylene oxide and ethylene oxide totaling 100%.

4. The process of claim 1, wherein A)(2) comprises an ethylenediamine initiated polyether polyol which contains from 50 to 100% by weight of 1,2-propylene oxide and from 0 to 50% by weight of ethylene oxide, with the percents by weight of 1,2-propylene oxide and ethylene oxide totaling 100%.

5. The process of claim 1, wherein A)(2) comprises a triethanolamine-initiated polyether polyol which contains from 50 to 100% by weight of 1,2-propylene oxide and from 0 to 50% by weight of ethylene oxide, with the percents by weight of 1,2-propylene oxide and ethylene oxide totaling 100%.

6. The process of claim 1, wherein A)(3) comprises a sucrose-initiated polyether polyol which contains from 70 to 100% by weight of 1,2-propylene oxide and from 0 to 30% by weight of ethylene oxide, with the percents by weight of 1,2-propylene oxide and ethylene oxide totaling 100%.

7. The process of claim 1, wherein A)(3) comprises a sorbitol-initiated polyether polyol which contains from 70 to 100% by weight of 1,2-propylene oxide and from 0 to 30% by weight of ethylene oxide, with the percents by weight of 1,2-propylene oxide and ethylene oxide totaling 100%.

8. The process of claim 1, wherein A)(3) comprises a trimethylol propane-initiated polyether polyol which contains from 70 to 10% by weight of 1,2-propylene oxide and from 0 to 30% by weight of ethylene oxide, with the percents by weight of 1,2-propylene oxide and ethylene oxide totaling 100%.

9. The process of claim 1, wherein A)(3) comprises a glycerol-initiated polyether polyol which contains from 70 to 100% by weight of 1,2-propylene oxide and from 0 to 30% by weight of ethylene oxide, with the percents by weight of 1,2-propylene oxide and ethylene oxide totaling 100%.

10. The process of claim 1, wherein A)(5) water is present in an amount of from 0.5 to 7.0 parts by weight, based on 100 parts by weight of component A).

11. The process of claim 1 herein A)(6) said blowing agent consists essentially of cyclopentane.

12. The process of claim 1, wherein A)(6) said blowing agent is selected from the group consisting of cyclopentane, n-butane, isobutane, 2,2-dimethylbutane and mixtures thereof.

13. The process of claim 1, wherein A)(6) said blowing agent is selected from the group consisting of isopentane, cyclopentane, cyclohexane and mixtures thereof.

14. In a process for the production of a composite component comprising a rigid foam interlayer, the improvement wherein the rigid foam interlayer comprises the rigid polyurethane foam produced by the process of claim 1.

* * * * *